Figure 4:
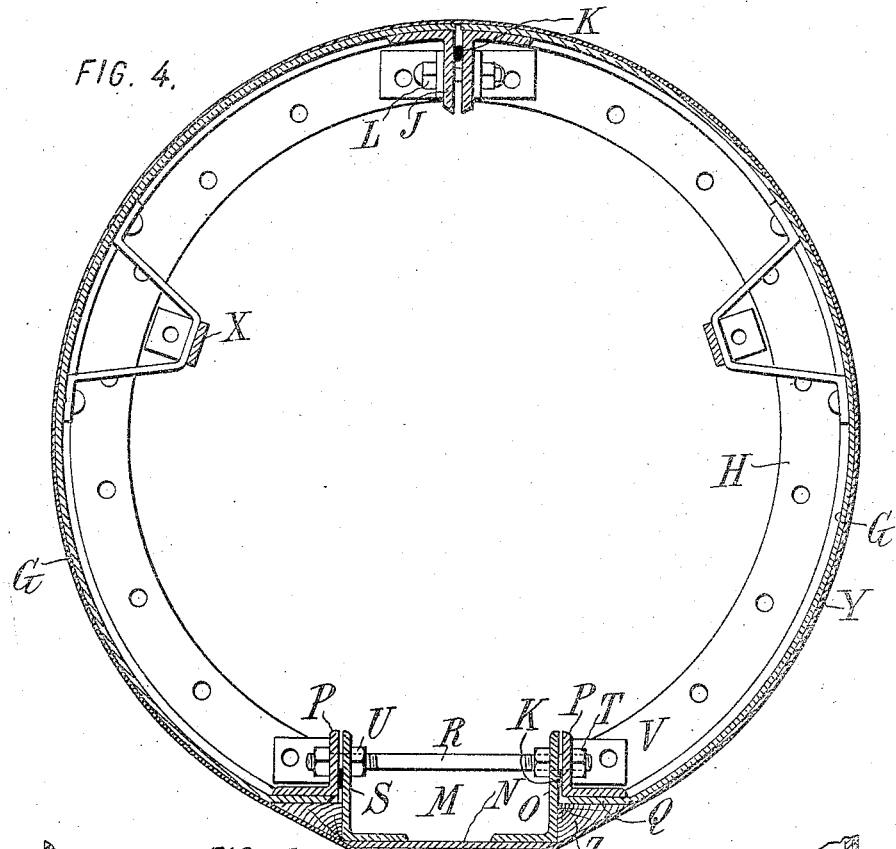

No. 828,861. PATENTED AUG. 14, 1906.
D. E. MORAN & J. W. DOTY.
SHAFTING FOR CAISSONS AND THE LIKE.
APPLICATION FILED APR. 4, 1906.
4 SHEETS—SHEET 1.
FIG. 1.
FIG. 2.
FIG. 3.
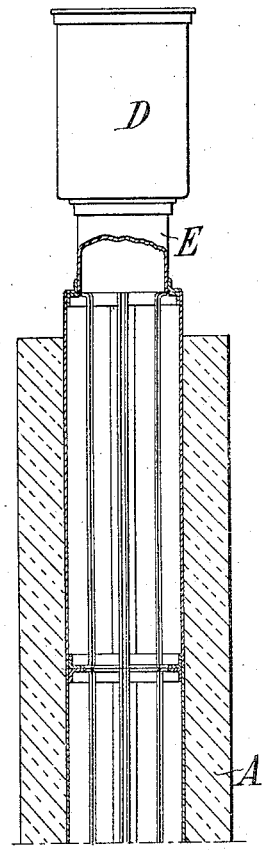
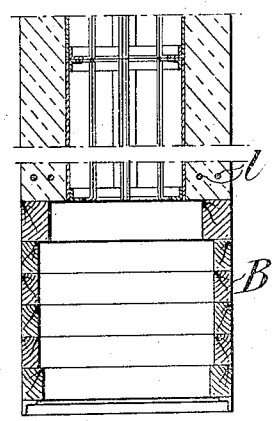
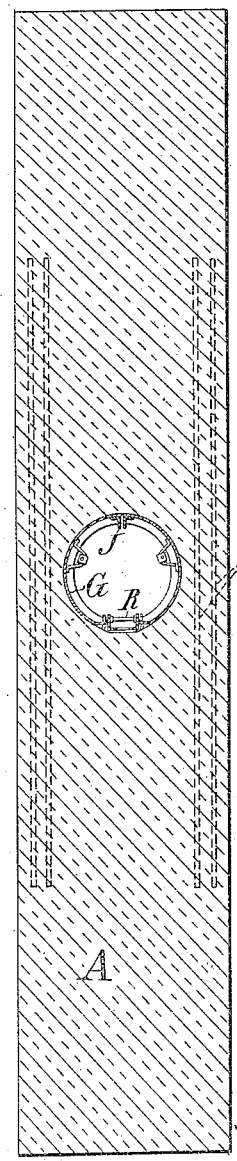
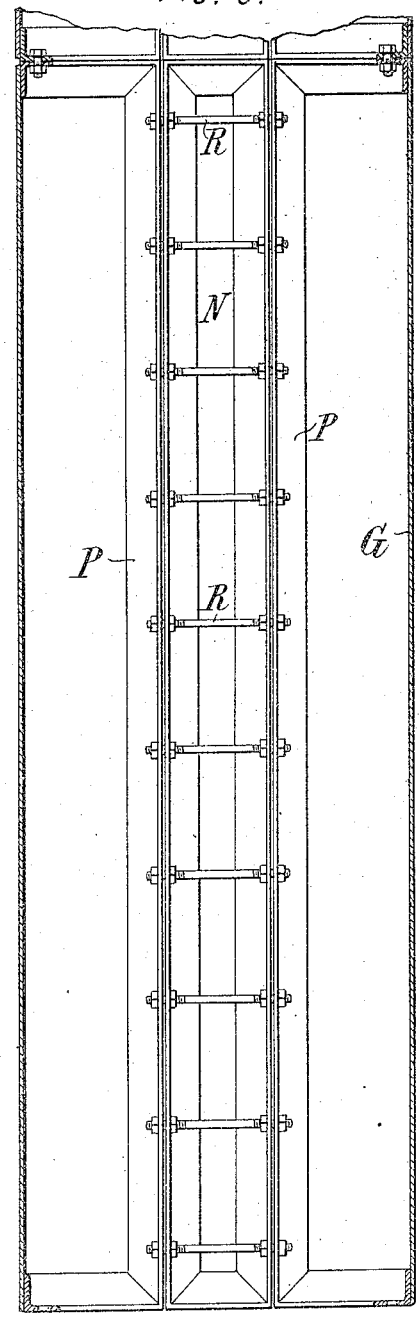
WITNESSES:
Fred White
Rene Bruine
INVENTORS:
Daniel E. Moran and John W. Doty,
By Attorneys,
Arthur E. Fraser & Usina No. 828,861. PATENTED AUG. 14, 1906.
D. E. MORAN & J. W. DOTY.
SHAFTING FOR CAISSONS AND THE LIKE.
APPLICATION FILED APR. 4, 1906.

4 SHEETS—SHEET 2.

WITNESSES:
Fred White
René Muine

INVENTORS:
Daniel E. Moran,
and John W. Doty,
By Attorneys,
Arthur E. Fraser & Usina No. 828,861. PATENTED AUG. 14, 1906.
D. E. MORAN & J. W. DOTY.
SHAFTING FOR CAISSONS AND THE LIKE.
APPLICATION FILED APR. 4, 1906.

4 SHEETS—SHEET 3.

WITNESSES:
Fred White
René Bruine

INVENTORS:
Daniel E. Moran and John W. Doty,
By Attorneys,

No. 828,861. PATENTED AUG. 14, 1906.
D. E. MORAN & J. W. DOTY.
SHAFTING FOR CAISSONS AND THE LIKE.
APPLICATION FILED APR. 4, 1906.
4 SHEETS—SHEET 4.
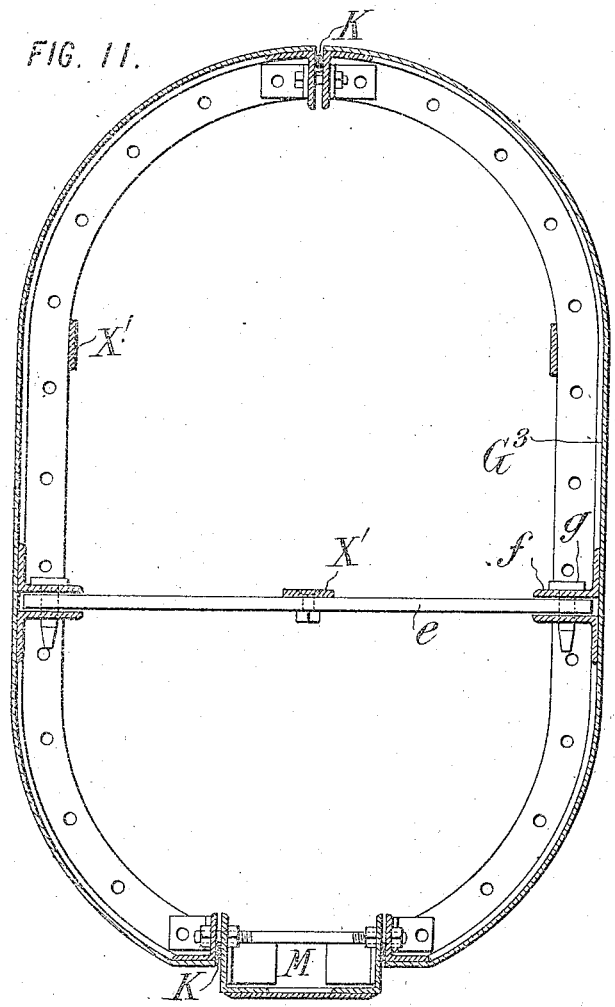
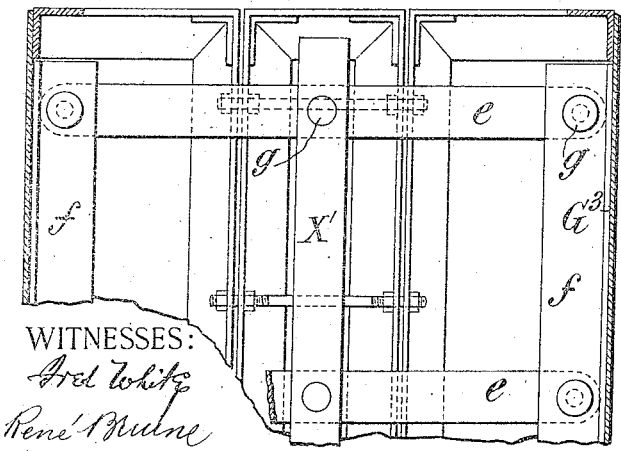
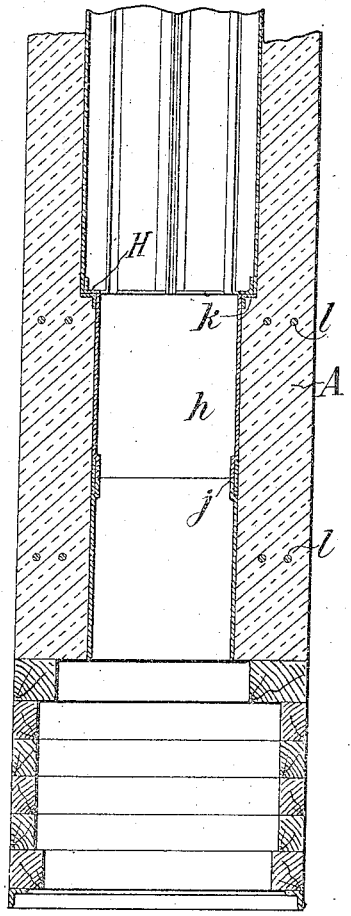
WITNESSES:
INVENTORS
Daniel E. Moran and John W. Doty,
By Attorneys,

UNITED STATES PATENT OFFICE.

DANIEL E. MORAN, OF MENDHAM, NEW JERSEY, AND JOHN W. DOTY, OF NEW YORK, N. Y.

SHAFTING FOR CAISSONS AND THE LIKE.

No. 828,861.   Specification of Letters Patent.   Patented Aug. 14, 1906.

Application filed April 4, 1906. Serial No. 309,850.

*To all whom it may concern:*

Be it known that we, DANIEL E. MORAN, a citizen of the United States, residing in Mendham, in the county of Morris and State of New Jersey, and JOHN W. DOTY, a subject of the King of Great Britain, residing in the borough of Manhattan, city, county, and State of New York, have jointly invented certain new and useful Improvements in Shafting for Caissons and the Like, of which the following is a specification.

This invention provides an improved tubing or shafting which is air-tight and is made up of joints which are breakable from the inside, so that it may be used for the shaft-lining of pneumatic or other caissons and for a large variety of engineering structures.

In our application for patent, Serial No. 276,767, filed September 1, 1905, we have described certain improvements in pneumatic caissons such as are ordinarily used in making pier-foundations for buildings. The improved caisson there described is substantially the pier itself, the whole being constructed without the previously common cofferdam and being sunk after being molded above the ground, only a shaft in the center being left open to permit access to and from the working chamber. The shafting of the present invention is of particular advantage in such caissons, though, as stated before, it is applicable in whole or in part to a great variety of structures. When used as a shaft-lining for such caissons, it serves first to provide a form or mold about which the masonry (usually concrete) body of the caisson or pier is formed and to reinforce such concrete body against accidental strains to which it is sometimes subjected. As the pier is being sunk the shafting serves to provide a passage to the working chamber. It is preferably of steel, with tight joints, so that it resists the strong inward pressure due to the tamping of the concrete about it and so that above the finished concrete it is able to resist the inside pressure of air and to form a continuous connection from the working chamber up to the bottom of the air-lock. When the pier is sunk to the desired depth, the shafting may be withdrawn, preferably by collapsing it, so as to lessen its diameter. In the term "collapsing" we include not only mere reduction of the diameter of the shafting as a whole, but its separation into parts of less diameter or the removal of one or more parts and the contraction of the remainder. The parts of the shafting may be removed section by section or a portion extending the entire length of the shaft may be removed with the different sections attached to each other.

Various other points of improvement are referred to in detail hereinafter.

The accompanying drawings illustrate embodiments of the invention.

Figure 5:
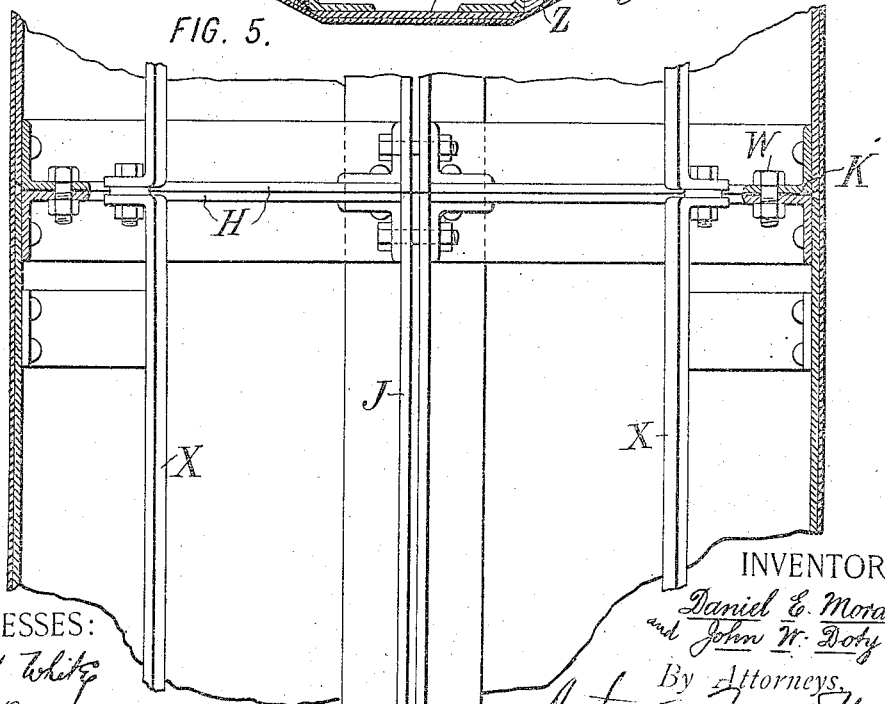
Figure 6:
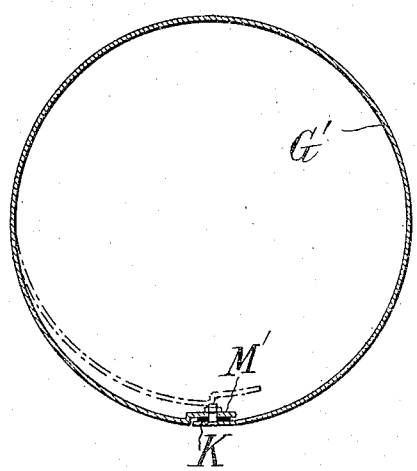
Figure 7:
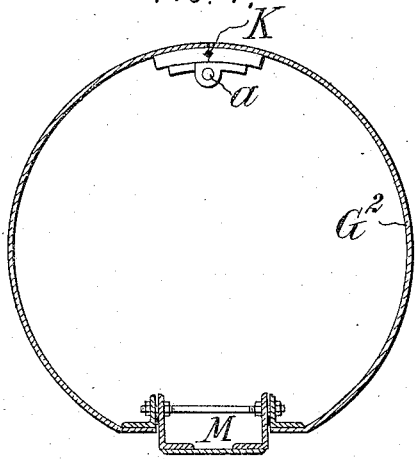
Figure 8:
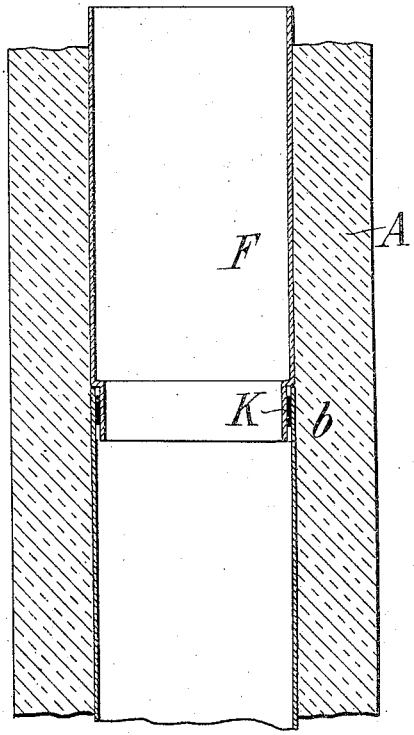
Figure 9:
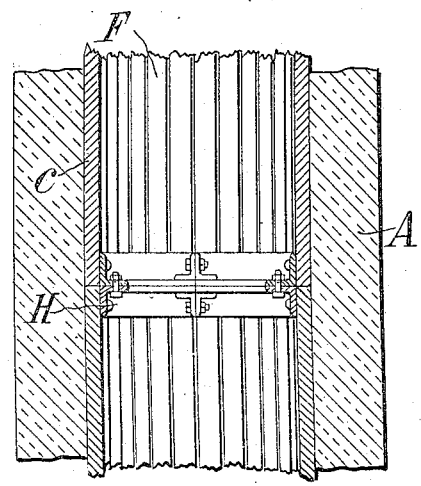
Figure 10:

Figure 1 is a transverse vertical section through the center of a caisson. Fig. 2 is a horizontal section of the same. Fig. 3 is a vertical section of one of the sections of the shafting. Fig. 4 is a horizontal section thereof. Fig. 5 is a vertical section showing the side opposite to that shown in Fig. 3. Figs. 6 and 7 are horizontal sections of alternative forms. Figs. 8 and 9 are vertical sections of alternative forms. Fig. 10 is a horizontal section of Fig. 9. Figs. 11 and 12 are respectively a horizontal and a vertical section of an alternative form of shafting. Fig. 13 is a vertical section of a style of tubing or shafting which may be used in connection with the other styles shown.

Referring to the embodiment of the invention illustrated, A is the body of the caisson or pier, which is supported upon and forms, in effect, the roof of a working chamber B, having been molded in place upon a false flooring supported from cross-bars which afterward remain embedded in the concrete, as more fully described in our aforesaid application. The air-lock is shown at D and may be of any usual construction provided, for example, with the downward tubular extension E.

The shafting, which is indicated as a whole by the letter F, is preferably supported upon any suitable temporary support and the concrete of the body A molded about it, as shown. The upper end is connected to the tubular extension E of the air-lock. The shafting F will be made in sections of various length—say five to twenty feet in length. When it is desired to build another section of the pier upon that already completed, (and usually sunk to approximately the level of the ground,) the air-lock is removed and an additional section of shafting inserted, the shafting being extended beyond the concrete and serving as a mold or form for the next section of concrete. Its function differs from that of an ordinary internal form such as is used with various concrete structures, since this use is secondary, the primary function being to maintain a passage, preferably perfectly air-tight, between the air-lock and the working chamber. The successive lengths of shafting added during the forming and sinking of the concrete remain in place until the entire structure is completed and sunk to the desired depth.

An important function is the reinforcing of the concrete. When a caisson of the shape shown in Fig. 2, which is a shape taken from actual practice, is molded in a section, say, twenty feet high and ready to begin sinking, the outside mold being removed it is practically impossible to preserve it upon a perfectly horizontal bed and there are considerable strains throughout the body. At the point where the shaft passes through is obviously the greatest weakness. The shaft, which is preferably of steel, reinforces the concrete at this point and protects it from abrasion by buckets and men.

The construction of the shafting may vary within wide limits. The collapsing is effected from the inside, and we preferably provide a key portion which may be readily withdrawn and the withdrawal of which permits the collapsing of the remaining portion.

The successive sections are preferably connected to each other by internal flanges, which construction leaves the outer faces of the several parts smooth, so that the corresponding parts of successive sections may be drawn up and out of the concrete without separating them from each other. We preferably provide also certain guides within the internal flanges which prevent the buckets from engaging the flanges in passing through the shaft. Preferably, also, means are provided for preventing the adhesion of the surrounding concrete to the shafting, which adhesion would be quite strong under the pressure due to the tamping of the concrete. By this means the removal of the shafting is made extremely easy, and there is no danger of injury to the concrete or to the shafting.

Referring to the construction illustrated in Figs. 3, 4, and 5, the shafting consists of two portions G, each extending approximately half-way around the periphery of the opening. The opening is shown circular in cross-section, but may be of any desired shape. These portions are preferably of sheet-steel and are provided at their upper and lower edges with horizontal flanges H, which may, for example, be formed by angle-irons riveted to the sheet-metal plates. At one edge of each of the plates G there is also a radial flange J, which may be a flange of an angle-iron riveted upon the vertical edge of the plate. These flanges J are brought together, preferably with a packing K between them, and are bolted securely to each other, as by bolts L. The opposite vertical edges of the plates G are separated by a key designated as a whole by the letter M and which is channel-shaped, being formed of a flat plate N, with flanges O, formed by means of angle-irons riveted along its vertical edges. The flanges O project in a considerable distance. Upon the adjacent edges of the plates G are flanges P, preferably also forming parts of angle-irons fastened upon the corresponding edges of the plates, these edges of such plates being preferably bent inward in the manner shown to bring the edges of the flanges O and P together. The channel M is made of substantial depth to afford room for the hands of the workmen in climbing the ladder, whose rungs are indicated at R. This construction provides for the ladder without interfering with the space through which the bucket passes, the rungs R being substantially in line with the inner edges of the horizontal flanges H, within which of course the bucket must pass. The rungs serve the additional purpose of tying together the vertical flanges P upon the edges of the plates G, so as to prevent them from exerting any strain upon the long and comparatively weak flanges O of the channel. For this purpose each rung R is preferably a bolt threaded at both ends, so as to receive at each end a pair of nuts clamping the flanges P and O together and pressing a strip of packing S between them. When the shafting is to be collapsed, the nut T may be withdrawn from the bolt and the nut U screwed sufficiently far toward the center of the bolt to permit the withdrawal of the end V through its flange O, after which it may be swung horizontally sufficiently to permit its removal. The entire key M may then be withdrawn, after which the removal of the bolts L permits the separation of the two plates G. Each of the three parts described is smaller in diameter than the opening in the concrete and may be readily drawn up through such opening. As stated before, the bolts W, connecting the horizontal flanges at the ends of the several parts, need not be withdrawn until the parts are lifted to the top. Each joint is packed air-tight with the packing K. The guides for preventing interference of the horizontal flanges with the bucket are preferably narrow vertical plates X, fastened by suitable brackets to the plates G and extending a substantial distance inward, and the edges of the flanges J, which for this purpose are made to extend inward beyond the inner edges of the horizontal flanges and the edges of the flanges O and P, which extend inward similarly. In order to prevent adhesion of the concrete to the outside of the metal shafting, special means are provided—such, for example, as a coating of soap or other suitable lubricant, or, preferably, as shown, a layer of paper Y, which extends continuously around the shafting. The outside angle formed by the key M is preferably filled in with blocks Z of wood or other suitable material to prevent the breakage of the paper at this point.

Instead of using plates G and a key M, which are separable from each other, the shafting may be made up of a plate G', adapted to spring inward when the bolt M' is withdrawn in the manner indicated diagrammatically in Fig. 6, or, as indicated in Fig. 7, plates G² may be used, which are connected to each other by a pivotal joint $a$, so that they may be swung inward when the key M is withdrawn.

Instead of the type of horizontal joint shown the successive sections may be united by a telescopic joint $b$, Fig. 8, the sections being suitably shaped for this purpose.

Although metal shafting is preferable for reasons outlined above, yet it is within the invention to employ wooden staves $c$, as shown in Fig. 9, the horizontal joints being made with angle-irons H. Any suitable collapsing arrangement may be employed with the constructions shown in Figs. 8 and 9. The vertical joints between the staves $c$ may be made air-tight by means of a packing K of any suitable material arranged between them.

It will be useful in many cases to make a shaft somewhat larger than the diameter of the bucket and oblong in shape, as shown in Fig. 11. In this case the plates G³ operate substantially in the same manner as in the previous construction. They are, however, elongated and tied together by a series of bars $e$, adapted to resist either inward or outward pressure, the ends being fastened between the inwardly-projecting flanges of angle-iron $f$. Guides X', fastened at the points indicated, serve to prevent the bucket from being interfered with. This construction leaves a considerable space at the side of the shaft through which men may pass up and down without fear of the bucket or through which they may pass when the bucket is stuck. The collapsing is effected by withdrawing the key M and the pins $g$ and removing the bars $e$.

It is in the beginning of the erection that the concrete is subjected to the greatest strain, and the greatest strain comes always upon the lowest portion of the concrete. Where very narrow piers are to be erected, it is advantageous to limit the diameter of the shaft, so as to leave as much concrete at the sides as possible. For the lowest section of the shaft we may use a tube $h$, Fig. 13, either continuous from top to bottom or made of several lengths connected by a flush-joint $j$, the section $h$ being connected by the outside flange or angle-iron $k$ with the inside flange or angle-iron H of the lowest regular section. When the flange H is unbolted from the flange $k$ after the work has been completed and the upper sections are withdrawn, the flange $k$ then becomes accessible and removable, so as to permit the collapsing of the lowest section $h$. Any suitable construction of the lowest section $h$ which will permit its collapsing may be adopted. We propose also to strengthen the concrete at its narrowest portions immediately alongside of the shaft by embedding therein a series of longitudinal rods $l$ at suitable intervals and extending for a long distance into the adjacent masses of concrete, so as to provide a strong connection with the concrete. This arrangement adds to the concrete at the weak point the tensile strength which is necessary to enable it to resist incidental severe strains.

Though we have described with great particularity of detail certain specific embodiments of the invention, yet it is not to be understood therefrom that the invention is limited to the particular embodiments disclosed. Various modifications thereof in detail and in the arrangement and combination of the parts may be made by those skilled in the art without departure from the invention.

What we claim is—

1. A caisson comprising a working chamber, a body of masonry, and shafting passing through said body and serving as a passage to and from the working chamber, and collapsible to lessen its diameter so that it may be readily withdrawn.

2. A caisson comprising a working chamber, a body of concrete, and shafting passing through said body and serving as a passage to and from the working chamber and as an inside form against which the concrete is molded, said shafting being removable, and means for preventing adhesion of the concrete to the shafting.

3. A caisson comprising a working chamber, a body of masonry, and shafting passing through said body and serving as a passage to and from the working chamber, said shafting being formed in sections having inside flanges removable, and guides within said flanges to prevent the engagement of a bucket thereby.

4. A caisson comprising a working chamber, a body of masonry, and shafting passing through said body and serving as a passage to and from the working chamber, said shafting being substantially air-tight and adapted to be connected to an air-lock at its upper end and being adapted to resist the external pressure of the masonry and the internal pressure of air above the masonry, said shafting being collapsible to lessen its diameter so that it may be readily withdrawn when the pier is sunk to the required depth.

5. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same.

6. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, said key M being of channel form with ladder-rungs extending across near the edges of its flanges.

7. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, the upper and lower ends of said plates and said key being inwardly flanged for permitting ready attachment and detachment of successive sections.

8. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, the upper and lower ends of said plates and said key being inwardly flanged for permitting ready attachment and detachment of successive sections, and guides X extending vertically through the shaft and lying within the internal flanges.

9. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, said plates G having vertical flanges J through which they are bolted to each other, and having vertical flanges P, and said key having vertical flanges O which are bolted to the flanges P of the plates.

10. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, said plates G having vertical flanges J through which they are bolted to each other, and having vertical flanges O, ladder-rungs R provided with suitable screw-threads, and nuts on said rungs clamping the flanges O and P together, and also tying the opposite flanges P to each other directly.

11. A caisson comprising a working chamber, a body of masonry, and shafting passing through said body and serving as a passage to and from the working chamber, said shafting comprising plates G adapted to be connected to each other at one edge, and a key M adapted to be interposed between the other edges of said plates or to be withdrawn in order to collapse the same, and a layer of paper Y surrounding the whole.

12. A caisson comprising a working chamber, a body of masonry, and shafting passing through said body and serving as a passage to and from the working chamber, and as an inside form against which the masonry is built, said shafting being of oblong shape in cross-section and adapted to be collapsed to lessen its diameter.

13. A shafting of oblong shape in cross-section and adapted to be collapsed to lessen its diameter, and having rods e extending between its sides, bucket-guides in the shafting at one side of said rods, and a ladder at the other side.

14. The combination with a body of masonry and a section of shafting passing therethrough and serving as an inside form against which the masonry is built, said section having inside flanges and being collapsible to permit its withdrawal, and a section h of less diameter and having an outer flange k at one end connected with an inside flange of the first-mentioned section, said section h being without other flanges on its outer surface, whereby when the first-mentioned section is withdrawn the section h may also be collapsed and withdrawn.

15. The combination with the masonry body of a caisson, of a shaft passing through the same, and reinforcing-rods embedded in the masonry alongside the shaft and extending into the masonry at a distance from the shaft.

16. The combination with the concrete body A of a caisson, of a vertical shaft passing through the same, serving as a passage to and from the working chamber, and horizontal rods l embedded in said concrete near its lower end adjacent to said shaft.

17. A shaft adapted to resist external pressure and which is substantially air-tight so as to prevent leakage of internal air-pressure, said shaft being collapsible from the inside.

18. A shaft adapted to resist external pressure and which is substantially air-tight so as to prevent leakage of internal air-pressure, said shaft having longitudinal joints which are breakable from the inside.

19. A shaft adapted to resist external pressure and which is substantially air-tight so as to prevent leakage of internal air-pressure, said shaft comprising plates adapted to be connected to each other at one longitudinal edge, and a key adapted to be interposed between the other edges of said plates and to be withdrawn inwardly in order to collapse the same In witness whereof we have hereunto signed our names in the presence of two subscribing witnesses.

DANIEL E. MORAN.
JOHN W. DOTY.

Witnesses:
D. ANTHONY USINA,
THEODORE T. SNELL.